(12) United States Patent
Zhang et al.

(10) Patent No.: US 8,625,216 B2
(45) Date of Patent: Jan. 7, 2014

(54) SERVO ZONE DETECTOR

(75) Inventors: Xun Zhang, Westford, MA (US); Dahua Qin, Allentown, PA (US); Haitao Xia, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 22 days.

(21) Appl. No.: 13/490,913

(22) Filed: Jun. 7, 2012

(65) Prior Publication Data

US 2013/0329313 A1    Dec. 12, 2013

(51) Int. Cl.
G11B 5/09      (2006.01)
G11B 21/02     (2006.01)
G11B 5/596     (2006.01)

(52) U.S. Cl.
USPC .............. 360/39; 360/48; 360/75; 360/77.08

(58) Field of Classification Search
None
See application file for complete search history.

(56) References Cited

U.S. PATENT DOCUMENTS

| | | | |
|---|---|---|---|
| 4,777,544 A | 10/1988 | Brown et al. | |
| 5,130,866 A | 7/1992 | Klaassen et al. | |
| 5,237,325 A | 8/1993 | Klein et al. | |
| 5,278,703 A | 1/1994 | Rub et al. | |
| 5,309,357 A | 5/1994 | Stark et al. | |
| 5,341,249 A | 8/1994 | Abbott et al. | |
| 5,377,058 A | 12/1994 | Good et al. | |
| 5,521,948 A | 5/1996 | Takeuchi | |
| 5,523,902 A | 6/1996 | Pederson | |
| 5,594,341 A | 1/1997 | Majidi-Ahy | |
| 5,668,679 A | 9/1997 | Swearingen et al. | |
| 5,696,639 A | 12/1997 | Spurbeck et al. | |
| 5,768,044 A | 6/1998 | Hetzler | |
| 5,781,129 A | 7/1998 | Schwartz et al. | |
| 5,798,885 A | 8/1998 | Saiki et al. | |
| 5,835,295 A | 11/1998 | Behrens | |
| 5,844,920 A | 12/1998 | Zook et al. | |
| 5,852,524 A | 12/1998 | Glover et al. | |
| 5,892,632 A | 4/1999 | Behrens | |

(Continued)

FOREIGN PATENT DOCUMENTS

FR    2904168 A1    1/2008
WO    WO 03/047091    6/2003
WO    WO 2008/009620    1/2008

OTHER PUBLICATIONS

Annampedu, V. et al "Adaptive Algorithms for Asynchronous Detection of Coded Servo Signals Based on Interpolation", IEEE Transactions on Magnetics, vol. 41, No. 10, Oct. 2005.

(Continued)

*Primary Examiner* — Andrew L Sniezek
(74) *Attorney, Agent, or Firm* — Hamilton DeSanctis & Cha (57) ABSTRACT

The present inventions are related to systems and methods for transferring information to and from a storage medium, and more particularly to systems and methods for positioning a sensor in relation to a storage medium. For example, an apparatus for determining a sensor position is disclosed that includes discrete Fourier transform calculators operable to process input data to yield a magnitude response of the input data at each of a number of candidate frequencies, a comparator operable to compare the magnitude responses to yield a winning candidate frequency, a servo controller operable to process at least one servo field in the input data to identify a position of a sensor based on the at least one servo field, and a servo frequency synthesizer operable to establish a frequency of operation in the servo controller based at least in part on the winning candidate frequency.

19 Claims, 5 Drawing Sheets

(56) References Cited

U.S. PATENT DOCUMENTS

| | | |
|---|---|---|
| 5,955,783 A | 9/1999 | Ben-Efraim |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silvestrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,269,058 B1 | 7/2001 | Yamanoi et al. |
| 6,278,591 B1 | 8/2001 | Chang |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,476,989 B1 | 11/2002 | Chainer |
| 6,490,110 B2 | 12/2002 | Reed et al. |
| 6,493,162 B1 | 12/2002 | Fredrickson |
| 6,519,102 B1 | 2/2003 | Smith et al. |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,671,404 B1 | 12/2003 | Kawatani |
| 6,717,764 B2 | 4/2004 | Lake |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,865,040 B2 | 3/2005 | Fayeulle et al. |
| 6,876,511 B2 | 4/2005 | Koyanagi |
| 6,906,990 B2 | 6/2005 | Nagata et al. |
| 6,912,099 B2 | 6/2005 | Annampedu et al. |
| 6,963,521 B2 | 11/2005 | Hayashi |
| 6,980,382 B2 | 12/2005 | Hirano et al. |
| 6,999,257 B2 | 2/2006 | Takeo |
| 6,999,264 B2 | 2/2006 | Ehrlich |
| 6,999,404 B2 | 2/2006 | Furumiya et al. |
| 7,002,767 B2 | 2/2006 | Annampedu et al. |
| 7,016,131 B2 | 3/2006 | Liu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,133,227 B2 | 11/2006 | Chiang |
| 7,136,250 B1 | 11/2006 | Wu et al. |
| 7,154,689 B1 | 12/2006 | Shepherd et al. |
| 7,158,464 B2 | 1/2007 | Gushima et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,203,015 B2 | 4/2007 | Sakai et al. |
| 7,203,017 B1 | 4/2007 | Sutardja et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,286,313 B2 | 10/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,394,608 B2 | 7/2008 | Eleftheriou |
| 7,411,531 B2 | 8/2008 | Aziz et al. |
| 7,420,498 B2 | 9/2008 | Barrenscheen |
| 7,423,827 B2 | 9/2008 | Neville |
| 7,446,690 B2 | 11/2008 | Kao |
| 7,525,460 B1 | 4/2009 | Liu et al. |
| 7,529,320 B2 | 5/2009 | Byrne et al. |
| 7,558,177 B2 | 7/2009 | Ogura et al. |
| 7,602,567 B2 | 10/2009 | Park |
| 7,602,568 B1 | 10/2009 | Katchmart |
| 7,616,395 B2 | 11/2009 | Yamamoto |
| 7,620,101 B1 | 11/2009 | Jenkins |
| 7,630,155 B2 | 12/2009 | Maruyama et al. |
| 7,643,235 B2 | 1/2010 | Erden et al. |
| 7,656,982 B2 | 2/2010 | Gaedke et al. |
| 7,679,850 B2 | 3/2010 | Smith |
| 7,693,243 B2 | 4/2010 | Chen et al. |
| 7,738,200 B2 | 6/2010 | Annampedu |
| 7,768,437 B2 | 8/2010 | Annampedu et al. |
| 7,768,730 B2 | 8/2010 | Bliss et al. |
| 7,796,480 B2 | 9/2010 | Cheng et al. |
| 7,813,065 B2 | 10/2010 | Annampedu et al. |
| 7,821,730 B2 | 10/2010 | Cao |
| 7,835,104 B2 | 11/2010 | Yamashita et al. |
| 7,889,823 B2 | 2/2011 | Yang et al. |
| 7,929,237 B2 | 4/2011 | Grundvig et al. |
| 7,929,238 B1 | 4/2011 | Vasquez |
| 8,014,099 B2 | 9/2011 | Mathew et al. |
| 8,054,573 B2 | 11/2011 | Mathew |
| 8,054,931 B2 | 11/2011 | Annampedu |
| 8,059,349 B2 | 11/2011 | Annampedu et al. |
| 8,098,451 B2 | 1/2012 | Graef |
| 8,102,960 B2 | 1/2012 | Ran et al. |
| 8,107,573 B2 | 1/2012 | Chang |
| 8,154,818 B2 | 4/2012 | Mathew |
| 8,154,972 B2 | 4/2012 | Ratnakar Aravind |
| 8,169,726 B2 | 5/2012 | Wilson |
| 8,174,784 B2 | 5/2012 | Grundvig |
| 8,174,949 B2 | 5/2012 | Ratnakar Aravind |
| 8,213,106 B1* | 7/2012 | Guo et al. ............... 360/77.08 |
| 8,237,597 B2 | 8/2012 | Liu |
| 8,243,381 B2 | 8/2012 | Annampedu |
| 8,254,049 B2 | 8/2012 | Annampedu |
| 8,261,171 B2 | 9/2012 | Annampedu |
| 2002/0150179 A1 | 10/2002 | Leis et al. |
| 2005/0243455 A1 | 11/2005 | Annampedu |
| 2007/0064325 A1* | 3/2007 | Bi et al. ..................... 360/48 |
| 2007/0104300 A1 | 5/2007 | Esumi et al. |
| 2008/0056403 A1 | 3/2008 | Wilson |
| 2009/0142620 A1 | 6/2009 | Yamamoto et al. |
| 2009/0274247 A1 | 11/2009 | Galbraith et al. |
| 2010/0061490 A1 | 3/2010 | Noeldner |
| 2010/0067628 A1 | 3/2010 | Buehner |
| 2010/0142078 A1 | 6/2010 | Annampedu |
| 2011/0043938 A1 | 2/2011 | Mathew |
| 2011/0157737 A1 | 6/2011 | Grundvig et al. |
| 2011/0209026 A1 | 8/2011 | Xia |
| 2012/0036173 A1 | 2/2012 | Annampedu |
| 2012/0084336 A1 | 4/2012 | Yang |
| 2012/0087035 A1 | 4/2012 | Graef |
| 2012/0106607 A1 | 5/2012 | Miladinovic et al. |
| 2012/0120784 A1 | 5/2012 | Yang |
| 2012/0124241 A1 | 5/2012 | Yang et al. |
| 2012/0134042 A1 | 5/2012 | Annampedu |
| 2012/0134043 A1 | 5/2012 | Annampedu |
| 2012/0155587 A1 | 6/2012 | Annampedu |
| 2012/0182643 A1 | 7/2012 | Zhang |
| 2012/0236428 A1 | 9/2012 | Xia |

OTHER PUBLICATIONS

Aziz et al., "Asynchronous Maximum Likelihood (ML) Detection of Servo Repeatable Run Out (RRO) Data", Digest, IEEE Intl Mag Conf, vol. 42, No. 10, pp. 2585-2587 (Oct. 2006).

(56) References Cited

OTHER PUBLICATIONS

Aziz et al., "Interpolation Based Maximum-Likelihood(ML) Detection of Asynchronous Servo Repeatable Run Out (RRO) Data" IEEE Intl Mag Conf. vol. 42 No. 10 pp. 2585-2587, Oct. 2006.
Hagenauer et al., "A Viterbi algorithm with soft-decision outputs and its applications," in Proc. IEEE Global Telecom Conf 1989, Dallas, Texas, pp. 1680-1686 (Nov. 1989).
Kryder, M. et al "Heat Assisted Magnetic Recording" Proc. IEEE, vol. 96, No. 11, p. 1810, Nov. 2008.
Polikar, Robi "Ensemble Based Systems in Decision Making" IEEE Circuits and Systems Magazine Third qtr 2006, p. 21-47.
Weller et al "Thermal Limits in Ultrahigh-density Magnetic Recording" IEEE Trans. Magn. vol. 35, No. 6, p. 4423, Nov. 1999.

\* cited by examiner

SERVO ZONE DETECTOR

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data.

A servo control system is used to move the read/write head assembly across the storage medium as the medium is rotated, and may also control the rotation speed and therefore the frequency at which servo data is read. The read/write head assembly must be positioned correctly by the servo control system to properly read stored data. Patterns stored in servo regions or servo wedges on the storage medium enable the servo control system to position the read/write head assembly.

Servo wedges may be divided into multiple zones from the inner diameter to the outer diameter of the storage medium in order to improve efficiency. In contrast to a single-zone servo system, which has a constant servo speed but varying channel bit density from inner diameter to outer diameter, a zoned servo system has similar channel bit density but varying servo speed across zones.

However, when the read/write head assembly moves across a zone boundary and cannot locate the patterns in the servo wedges, it is difficult to determine whether this is due to poor signal quality or incorrect servo speed settings.

BRIEF SUMMARY

The present inventions are related to systems and methods for transferring information to and from a storage medium, and more particularly to systems and methods for positioning a sensor in relation to a storage medium. The servo zone detector disclosed herein provides a scheme to detect the underlying signal frequency in a zoned servo system. The detection is done by performing a Fourier transform on the readback servo waveform during the preamble, and identifying the frequency component that has the maximum Fourier coefficient. The preamble in the servo data contains a periodic data pattern that produces a characteristic frequency output that can be identified by the Fourier transform. The preamble patterns in each servo zone may be different patterns or may be the same patterns, written at different frequencies, resulting in a different magnitude response for each by the Fourier transform. Based on the different magnitude responses, the servo zone detector can help determine the current servo zone. This scheme can be used during zone switch to provide feedback to the servo controller firmware about the read head location, making it possible to correct the servo channel setting if it was set to wrong frequency, or to move the head if the head is in the wrong zone.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for transferring information to and from a storage medium, and more particularly to systems and methods for positioning a sensor in relation to a storage medium. The servo zone detector disclosed herein provides a scheme to detect the underlying signal frequency in a zoned servo system. The detection is done by performing a Fourier transform on the readback servo waveform during the preamble, and identifying the frequency component that has the maximum Fourier coefficient. The preamble in the servo data contains a periodic data pattern that produces a characteristic frequency output that can be identified by the Fourier transform. The preamble patterns in each servo zone may be different patterns or may be the same patterns, written at different frequencies, resulting in a different magnitude response for each by the Fourier transform. Based on the different magnitude responses, the servo zone detector can help determine the current servo zone. This scheme can be used during zone switch to provide feedback to the servo controller firmware about the read head location, making it possible to correct the servo channel setting if it was set to wrong frequency, or to move the head if the head is in the wrong zone.

Zoning is an effective method to improve the area density of hard disk drives. In a zoned disk, each zone has its own frequency, which is designed to make area density similar across zones. When servo wedges are zoned, it is important to have robust zone-switching performance. Ideally, the system would have perfect knowledge of the frequency in the target servo zone, and would configure the read channel hardware properly before switching to the new servo zone. However, in practice, errors may occur that either drive the read head to the wrong servo zone, or that configure the read channel for a wrong frequency, either of which could result in failure to find the servo sync address mark (SAM) and detect the track ID in the new servo zone. It is difficult for the servo controller to correct this kind of error without feedback from the read channel, because it may not be evident whether the failure is due to poor signal quality, or due to mismatch between the read channel frequency setting and the actual servo zone frequency. The servo zone detector assists the servo controller to detect the actual frequency in the new servo zone for corrections to the position of the read/write head. As a result, the servo controller firmware design for zone switches can be simplified, and performance can be more robust, facilitating servo zoning with its associated area density increase.

The servo zone detector detects the signal frequency among a pool of known candidate frequencies. It can be implemented using fast Fourier transform, thus the design complexity and latency are both low. The servo zone detector also compensates for different candidate frequency gains in the analog front end. The servo zone detector may operate in parallel to normal servo signal processing in a servo controller, using the same servo preambles, without increasing the number of preamble cycles used for gain and timing estimation, and thus without causing any additional format overhead.

Figure 1:
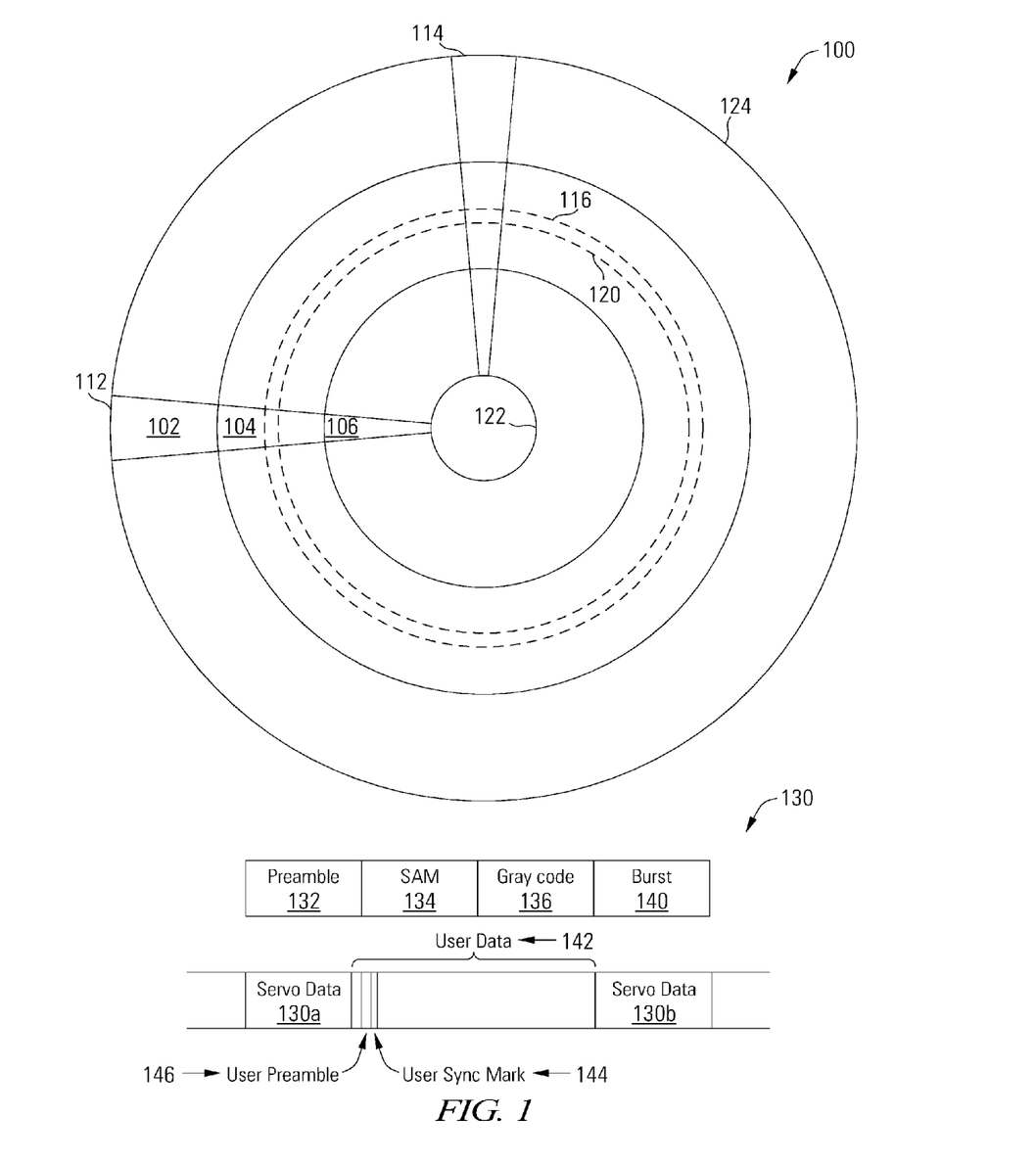
FIG. 1 depicts a diagram of a magnetic storage medium and sector data scheme with zoned servo wedges in accordance with one or more embodiments of the present inventions.

Turning to FIG. 1, a magnetic storage medium 100 with multiple servo zones (e.g., 102, 104, 106) in servo wedges (e.g., 112, 114) is depicted in accordance with one or more embodiments of the present inventions. The servo wedges 112, 114 may have any number of servo zones. Two exemplary tracks 116, 120 are shown, indicated as dashed lines. The tracks 116, 120 are segregated by servo data written within wedges 112, 114.

The servo wedges 112, 114 may extend from an inner diameter 122 to an outer diameter 124, each with a single wedge shape, and with the width increasing all the way from inner diameter 122 to outer diameter 124, or the shape of each wedge may be adjusted to avoid becoming too wide at outer diameter 124. Servo wedges 112, 114 may have any suitable shape and arrangement, and any number of servo wedges may be provided on storage medium 100. It should be noted that while two tracks 116, 120 and two servo wedges 112, 114 are shown, hundreds of wedges and tens of thousands of tracks would typically be included on a given storage medium.

The servo wedges 112, 114 include servo data 130 that are used for control and synchronization of a read/write head assembly over a desired location on storage medium 100. In particular, the servo data 130 generally includes a preamble pattern 132 followed by a servo address mark 134 (SAM). Servo address mark 134 is followed by a Gray code 136, and Gray code 136 is followed by burst information 140. It should be noted that a servo data set may have two or more fields of burst information. Further, it should be noted that different information may be included in the servo fields such as, for example, repeatable run-out information that may appear after burst information 140.

Between the servo data bit patterns 130a and 130b, a user data region 142 is provided. User data region 142 may include one or more sets of data that are stored to storage medium 100. The data sets may include user synchronization information some of which may be used as a mark to establish a point of reference from which processing of the data within user data region 142 may begin processing.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

As used herein, the phrase "sync mark" is used in its broadest sense to mean any pattern that may be used to establish a point of reference. Thus, for example, a sync mark may be a user sync mark 144 as is known in the art. Based upon the disclosure provided herein, one of ordinary skill in the art may recognize other sync marks that could be used in relation to different embodiments of the present invention.

As the sensor moves between servo zones 102, 104, 106, the servo zone detector performs a discrete Fourier transform (DFT) on the servo preamble 132 to detect the frequency of the servo preamble 132, finding the frequency component with the maximum coefficient and comparing the result with the known candidate frequencies to identify the current servo zone 102, 104, or 106. Other techniques may also be used to set the servo frequency, with the servo zone detector assisting with or confirming the frequency selection. For example, assuming an N-zone servo system with frequencies $f_1, f_2, \ldots f_N$, the servo controller is configured for a target frequency $f_T$, while the actual frequency in the new zone is $f_A$. The servo zone detector determines which frequency $f_A$ is among the set of frequencies $f_1, f_2, \ldots f_N$, with a readback servo waveform sampled at frequency $f_T$.

This detection can be done by performing discrete Fourier transform (DFT) on the preamble signal and finding the frequency component with the maximum coefficient.

Figure 2:
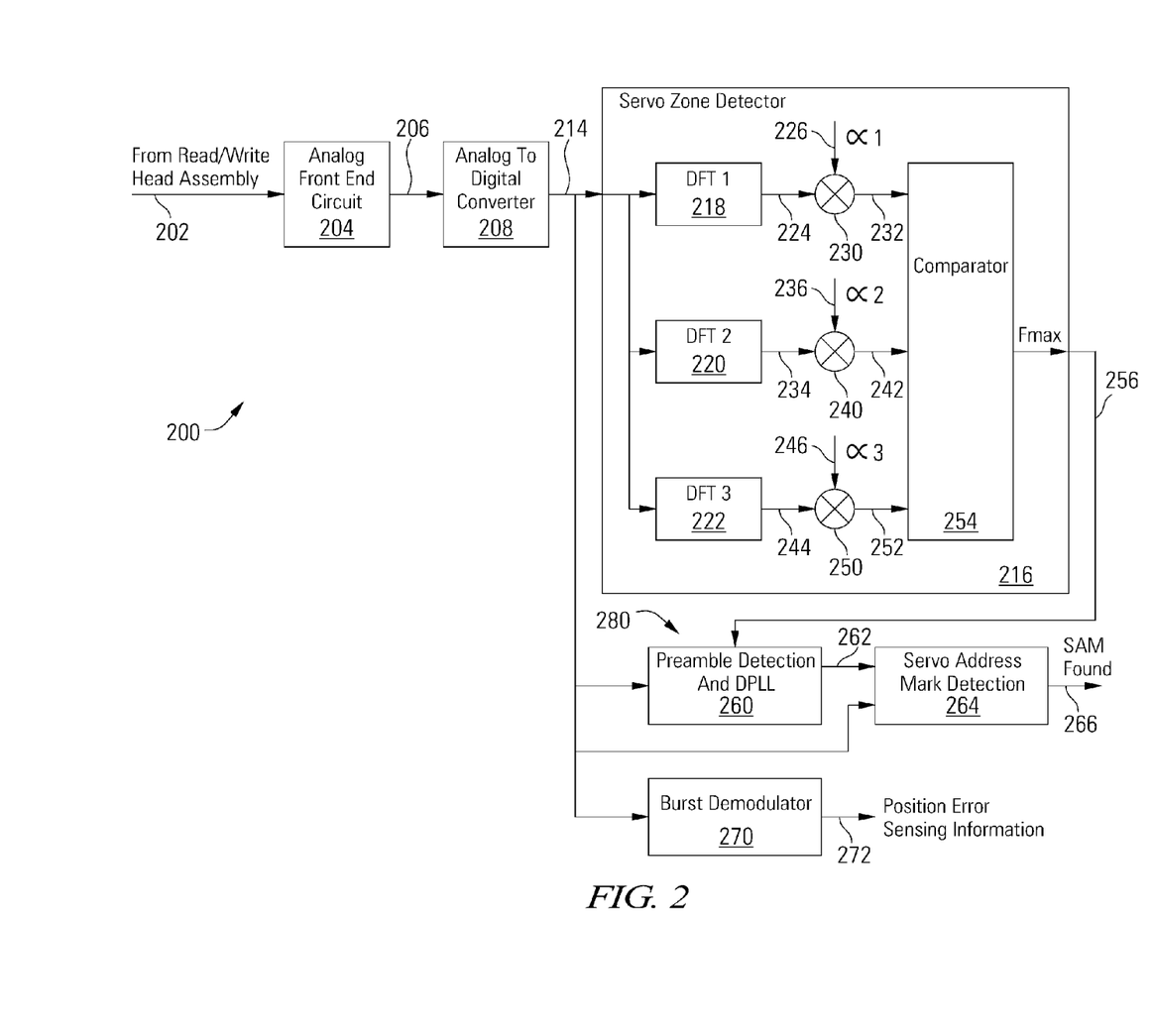
FIG. 2 is a block diagram of a servo channel with a servo zone detector in accordance with one or more embodiments of the present inventions.

Turning to FIG. 2, a pattern detector circuit 200 with a servo zone detector 216 is depicted in accordance with one or more embodiments of the present inventions. Such a servo channel 200 may be included, for example, in a read channel or a hard disk controller for a magnetic hard drive to locate servo preambles, servo address marks, etc. to position a read/write head assembly. The servo channel 200 includes an analog front end circuit 204 that receives and processes an analog signal 202 from the read/write head assembly. Analog front end 204 may include, but is not limited to, an analog filter and an amplifier circuit as are known in the art. For example, the analog front end 204 may include an AC coupler (ACC) or high pass filter, a variable gain amplifier (VGA), a compensation circuit for the magneto-resistive asymmetry (MRA) characteristic of a magnetic read head, etc. Based upon the disclosure provided herein, one of ordinary skill in the art will recognize a variety of circuitry that may be included as part of analog front end circuit 204. In some cases, the gain of a variable gain amplifier included as part of analog front circuit 204 may be modifiable, and the cutoff frequency and boost of an analog filter included in analog front end circuit 204 may be modifiable. Analog front end circuit 204 receives and processes the analog signal 202, and provides a processed analog signal 206 to an analog to digital converter circuit 208. The analog front end 204 may be configured in some embodiments as a relatively narrow band pass filter.

Analog to digital converter circuit 208 converts processed analog signal 206 into a corresponding series of digital samples 214. Analog to digital converter circuit 208 may be any circuit known in the art that is capable of producing digital samples corresponding to an analog input signal 206. Based upon the disclosure provided herein, one of ordinary skill in the art will recognize a variety of analog to digital converter circuits that may be used in relation to different embodiments of the present inventions.

The digital samples 214 may be processed in parallel by servo zone detector 216, a preamble detection and digital phase locked loop (DPLL) circuit 260 and burst demodulator 270.

The servo zone detector 216 includes a number of discrete Fourier transform (DFT) circuits 218, 220 and 222 that apply a DFT algorithm to the digital samples 214. The number of DFT circuits 218, 220 and 222 is based on the number of servo zones (e.g., 102, 104, 106). The DFT magnitude response for the servo preamble from each servo zone is different, with the characteristic frequency of each servo preamble pattern being sufficiently distant from the characteristic frequencies of the other servo preamble patterns to be distinguished by DFT circuits 218, 220 and 222. These frequencies are referred to herein as candidate frequencies for the servo zone preamble patterns. The candidate frequencies may comprise frequency ranges, with the ranges being as narrow or as wide as desired. DFT circuits 218, 220 and 222 are operable to identify the different energy peaks at the predetermined candidate frequencies of the preamble patterns in each of the servo zones (e.g., 102, 104, 106). The preamble patterns are periodic patterns that may yield a sinusoidal output or other waveform with energy peaks at the predetermined candidate frequencies across the frequency spectrum, whereas the frequency response of the user data and other data regions will likely be spread more uniformly across the frequency spectrum or will not have peaks in the predetermined candidate frequencies for the servo preambles.

In some embodiments, DFT circuits 218, 220 and 222 are enabled or receive the digital samples 214 when a servo gate signal (not shown) is asserted. In some embodiments, the servo gate signal is asserted when positioning the read/write head assembly and not reading user data to enable the entire servo channel 200.

DFT circuit 218 performs a discrete Fourier transform on the preamble signal in the digital samples 214 for the candidate frequency of the first servo zone preamble pattern, for example the preamble pattern of servo zone 102. DFT circuit 218 yields a magnitude response 224 of the digital samples 214 at the first candidate frequency (or within the first candidate frequency range). Because the analog front end circuit 204 includes a bandpass filter, and in some cases a relatively narrow bandpass filter, there may be unequal gain on the candidate frequency components. Scaling factors may be applied to the magnitude responses to compensate for this unequal gain.

The magnitude response 224 from DFT circuit 218 is scaled by scaling factor 226 in multiplier 230, yielding scaled magnitude response 232. DFT circuit 220 performs a discrete Fourier transform on the preamble signal in the digital samples 214 for the candidate frequency of the second servo zone preamble pattern, for example the preamble pattern of servo zone 104. DFT circuit 220 yields a magnitude response 234 of the digital samples 214 at the second candidate frequency (or within the second candidate frequency range). Magnitude response 234 from DFT circuit 220 is scaled by scaling factor 236 in multiplier 240, yielding scaled magnitude response 242. DFT circuit 222 performs a discrete Fourier transform on the preamble signal in the digital samples 214 for the candidate frequency of the third servo zone preamble pattern, for example the preamble pattern of servo zone 106. DFT circuit 222 yields a magnitude response 244 of the digital samples 214 at the third candidate frequency (or within the third candidate frequency range). Magnitude response 244 from DFT circuit 222 is scaled by scaling factor 246 in multiplier 250, yielding scaled magnitude response 252.

Multipliers 230, 240, 250 may comprise any circuit known in the art that is capable of scaling magnitude responses 224, 234, 244. Based upon the disclosure provided herein, one of ordinary skill in the art will recognize a variety of scaling circuits that may be used in relation to different embodiments of the present inventions. In some embodiments, the scaling factors are programmable, for example using a gain adjust configuration register for each scaling factor 226, 236, 246 to select a scaling factor as illustrated in Table 1 below:

TABLE 1

| Gain adjust | Scaling factor |
| --- | --- |
| 0 (default) | 0 |
| 1 | 1/16 |
| 2 | −1/16 |
| 3 | 1/8 |
| 4 | −1/8 |
| 5 | 1/4 |
| 6 | −1/4 |

A comparator 254 determines which scaled magnitude response 232, 242, 252 is greatest, yielding an indication of which candidate frequency is greatest at output 256. In some embodiments, the comparator 254 also determines whether the largest magnitude response is greater than the sum of the other magnitude responses before identifying a candidate frequency at output 256. If the detected candidate frequency at output 256 is different than the current servo synthesizer setting in preamble detection and DPLL circuit 260, the servo channel 200 can either reprogram the servo synthesizer to the new frequency, or reprogram the servo synthesizer to the new frequency after a user programmable number of SAM search failures, or store a flag allowing a servo controller 280 to decide whether to change the synthesizer setting in the next servo wedge.

Comparator 254 may be calibrated to compensate for unequal gain across candidate frequencies in analog front end circuit 204, in which case the multipliers 230, 240, 250 may be omitted.

The preamble detection and DPLL circuit 260 may process the digital samples 214 in parallel with servo zone detector 216. Preamble detection and DPLL circuit 260 is operable to detect a known preamble pattern, and to adjust the phase and/or frequency of the DPLL circuit or of the analog to digital converter circuit 208 accordingly. Preamble detection and sampling clock synchronization may be done using any process known in the art for recovering a clock from a received data stream. For example, digital phase lock loop circuit 260 may be implemented consistent with preamble detector and clock recovery circuits used in existing hard disk drive systems.

Once a preamble is detected, a preamble detected signal 262 is asserted. At this point, a SAM detection circuit 264 begins querying digital samples 214 for a known servo address mark pattern. SAM detection circuit 264 is operable to detect a servo address mark and to assert a SAM Found signal 266 upon identifying the servo address mark. This SAM Found signal 266 may be comparable to SAM Found signals that have been used in the existing art to synchronize the processing of subsequent Gray code data and burst information. The Gray code data 136 may be processed in the SAM detection circuit 264 or in a Gray code detector (not shown) to provide position information about the read/write head assembly. A Repeatable Runout (RRO) data field (not shown) may also be provided and processed in a known manner, providing head positioning information that is more precise than that provided by the encoded Gray data field 136. A burst demodulator 270 processes the digital samples 214, demodulating the burst information 140 in the servo data 130 to provide position error sensing information 272 or head positioning information that is more precise than that provided by the Gray code 136 or RRO data field to keep the read/write head assembly on track.

Servo controller 280 may include any circuits or components to set the servo synthesizer frequency and to determine the location of the read/write head assembly, for example including preamble detection and DPLL circuit 260 or servo frequency synthesizer to set the operating frequency of the servo controller.

The DFT's 218, 220, 222 operate on the digital samples 214 using any suitable Fourier transform operation. By focusing each of the DFT's 218, 220, 222 on a different one of the candidate servo zone preamble frequencies to process a servo preamble, the DFT operation focused on the actual candidate servo zone preamble frequency of the servo zone being read will have a higher magnitude response than the DFT operations processing the preamble in the same servo zone but targeted at the other candidate frequencies. In some embodiments, the DFT's 218, 220, 222 apply the operation of Equation 1:

$$X(k) = \frac{4}{N} \times \sum_{n=0}^{N-1} x_n \cdot e^{-j\frac{2\pi \cdot k \cdot n}{N}} \quad \text{(Eq 1)}$$

$$= \frac{4}{N} \times \sum_{n=0}^{N-1} x_n \sin\left(\frac{2\pi \cdot k \cdot n}{N}\right) + j \cdot \sum_{n=0}^{N-1} x_n \cos\left(\frac{2\pi \cdot k \cdot n}{N}\right)$$

$$= Xs(k) + jXc(k)$$

where k is the index to the candidate frequencies calculated in terms of frequency ratios, n is the index to the time domain samples, and $x_n$ are the digital samples 214. If the servo wedges 112, 114 on the storage medium 100 have three zones 102, 104, 106, the underlying or current servo wedge has three candidate frequencies, and the DFT operation of Equation 1 is performed for 3 k values, k0, k1 and k2.

The k frequency index values can be calculated from frequency ratios rather than the actual candidate frequencies according to Equation 2:

$$k_0 = \text{round}\left(\frac{\text{FREQ\_ZONE0}}{\text{freq\_ref}} \times \frac{N}{4}\right) \quad \text{(Eq 2)}$$

$$k_1 = \text{round}\left(\frac{\text{FREQ\_ZONE1}}{\text{freq\_ref}} \times \frac{N}{4}\right)$$

$$k_2 = \text{round}\left(\frac{\text{FREQ\_ZONE2}}{\text{freq\_ref}} \times \frac{N}{4}\right)$$

where FREQ_ZONE is used to set up the frequency ratio between zones, and freq_ref is the FREQ_ZONE* setting corresponding to the current servo setting. For example, if the three candidate servo zone frequencies are 400 MHz, 500 MHz, and 600 MHz, the ratio would be 4:5:6, then FREQ_ZONE0=4, FREQ_ZONE1=5, FREQ_ZONE2=6. If the head is currently believed to be in zone 1 (among zone0, zone1 and zone2), ZONE_FREQ_NOW='010', and freq_ref=FREQ_ZONE1=5. Scaling factor N/4 reduces the length of the DFT result, simplifying the use of the result in the servo zone detector 216. With a 64-point DFT, i.e., N=64, $k_0$=round(FREQ_ZONE0/freq_ref*N/4)=round(4/5*64/4)=round(4/5*16)=13

$k_1$=round(FREQ_ZONE1/freq_ref*N/4)=round(5/5*64/4)=16

$k_2$=round(FREQ_ZONE2/freq_ref*N/4)=round(6/5*64/4)=19

Table 2 shows the k0, k1 and k2 values for the example zoned servo system with candidate preamble pattern frequencies of 400 MHz, 500 MHz and 600 MHz:

TABLE 2

| Fssynth | ZONE_FREQ_NOW | $k_0$ | $k_1$ | $k_2$ |
|---|---|---|---|---|
| 400 MHz | 001 | 16 | 20 | 24 |
| 500 MHz | 010 | 13 | 16 | 19 |
| 600 MHz | 100 | 11 | 13 | 16 |

Notably, only two k values need to be calculated for any given servo synthesizer setting in this example, since the k value corresponding to the reference frequency, i.e., the one indicated by ZONE_FREQ_NOW, is always 16 as shown in the table above.

To calculate Xs(k) and Xc(k) of Equation 1 for any frequency ratio, the Fourier coefficients, i.e., sin(2πkn/N) and cos(2πkn/N) for n∈[0,N−1] and k∈[0,N−1] are calculated or retrieved from a lookup table. Given that for an N-point DFT, there are N distinct values for sin(2πkn/N) and cos(2πkn/N) respectively, and for the N-point DFT, the 2N coefficients can be stored in a lookup table, and the table can be used to support any DFTs with smaller length as long as the length is a power of 2. For example, if N=32, the lookup table will store 64 DFT coefficients for each of the two terms as shown in Table 3 below.

TABLE 3

| i | sin(2πi/N) | cos(2πi/N) | i | sin(2πi/N) | cos(2πi/N) |
|---|---|---|---|---|---|
| 0 | 0 | 16 | 32 | 0 | −16 |
| 1 | 2 | 16 | 33 | −2 | −16 |
| 2 | 3 | 16 | 34 | −3 | −16 |
| 3 | 5 | 15 | 35 | −5 | −15 |
| 4 | 6 | 15 | 36 | −6 | −15 |
| 5 | 8 | 14 | 37 | −8 | −14 |
| 6 | 9 | 13 | 38 | −9 | −13 |
| 7 | 10 | 12 | 39 | −10 | −12 |
| 8 | 11 | 11 | 40 | −11 | −11 |
| 9 | 12 | 10 | 41 | −12 | −10 |
| 10 | 13 | 9 | 42 | −13 | −9 |
| 11 | 14 | 8 | 43 | −14 | −8 |
| 12 | 15 | 6 | 44 | −15 | −6 |
| 13 | 15 | 5 | 45 | −15 | −5 |
| 14 | 16 | 3 | 46 | −16 | −3 |
| 15 | 16 | 2 | 47 | −16 | −2 |
| 16 | 16 | 0 | 48 | −16 | 0 |
| 17 | 16 | −2 | 49 | −16 | 2 |
| 18 | 16 | −3 | 50 | −16 | 3 |
| 19 | 15 | −5 | 51 | −15 | 5 |
| 20 | 15 | −6 | 52 | −15 | 6 |
| 21 | 14 | −8 | 53 | −14 | 8 |
| 22 | 13 | −9 | 54 | −13 | 9 |
| 23 | 12 | −10 | 55 | −12 | 10 |
| 24 | 11 | −11 | 56 | −11 | 11 |
| 25 | 10 | −12 | 57 | −10 | 12 |
| 26 | 9 | −13 | 58 | −9 | 13 |
| 27 | 8 | −14 | 59 | −8 | 14 |
| 28 | 6 | −15 | 60 | −6 | 15 |
| 29 | 5 | −15 | 61 | −5 | 15 |
| 30 | 3 | −16 | 62 | −3 | 16 |
| 31 | 2 | −16 | 63 | −2 | 16 |

In other embodiments, the DFT calculation is performed by a DFT calculation circuit, and a COordinate Rotation DIgital Computer (CORDIC) calculates the magnitude response using the DFT calculation result, Xs and Xc.

The DFT of Equation 1 may be performed on the digital samples 214 over a window of samples with either fixed or programmable length N. In some embodiments, the servo zone detector 216 operates either in a search mode in which the location of the servo wedge 112 or preamble pattern 132 is unknown or uncertain, or a non-search mode in which the location of the preamble pattern 132 is known or likely known.

Figure 3:
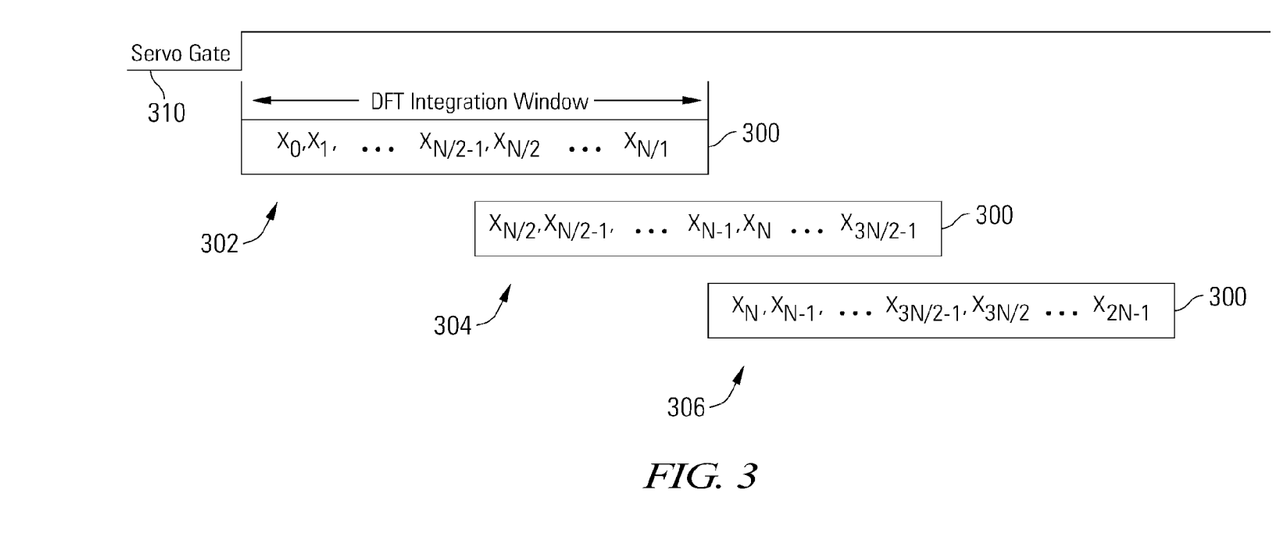
FIG. 3 depicts a sliding DFT integration window in three different locations in search mode operation in a servo zone detector in accordance with one or more embodiments of the present inventions.

Turning to FIG. 3, the sliding DFT integration window 300 of search mode operation is depicted in three different locations 302, 304, 306, with the window 300 starting when the servo gate signal 310 is asserted to initiate the pattern location operations in servo channel 200. The window width is selected based on the desired accuracy and detection rate. The wider the window, the better the frequency resolution, but if the window is too long the DFT will take longer to calculate, and if the window is longer than the servo preamble, the DFT will include the sync address mark or miscellaneous data before the servo preamble and the results will be impaired. In some embodiments, the width of the sliding DFT integration window 300 is set at about half the servo preamble length, allowing two frequency updates from the DFT within a servo preamble. The width of the sliding DFT integration window 300 may be hard coded in the servo zone detector 216 or may be programmable. In this example, the sliding DFT integration window 300 is N bits wide, initially including bits $X_0$ to $X_{N-1}$ of digital samples 214 after the servo gate signal 310 is asserted, then sliding or jumping to include bits $X_{N/2}$ to $X_{3N/2-1}$, then sliding or jumping to include bits $X_N$ to $X_{2N-1}$.

In some embodiments, the sliding DFT integration window 300 is shifted between the different locations 302, 304, 306 in discrete jumps. In the example embodiment illustrated in FIG. 3, the positions 302, 304, 306 of the sliding DFT integration window 300 overlap by half of the DFT length, ensuring that there are sufficient new samples to make a difference in the DFT result, while using the samples sufficiently to avoid missing the servo preamble field due to the window location. In other embodiments, the sliding DFT integration window 300 may be shifted sample by sample or several samples at a time, although this increases the number of DFT calculations to be made. The number of positions 302, 304, 306 at which the sliding DFT integration window 300 is placed during the DFT calculation is not limited to the example three positions illustrated in FIG. 3, but may continue to repeat as long as the servo gate signal 310 is asserted or until the servo address mark is detected. If the servo address mark is detected, it indicates that the current servo synthesizer setting is correct, thus the frequency detection result from the servo zone detector 216 can be ignored. If the servo gate signal 310 drops before the servo address mark is detected, the current servo frequency is wrong and the preamble detection and DPLL circuit 260 can use the frequency identified by the servo zone detector 216 at the next servo gate.

After each DFT calculation, the resulting magnitude response for each of the candidate frequencies are compared, and the winner is declared if the following two conditions are met:
  1) The corresponding magnitude is greater than the sum of some or all of the next largest magnitude responses. For example, with three candidate frequencies, this condition is met if the largest magnitude response is greater than the sum of the other two magnitude responses; and
  2) The winning margin, defined as the ratio of the winning magnitude over the sum of some or all of the next largest magnitude responses, is greater than the winning margin of the previous winning frequency decision. In some embodiments, this comparison is reset at each new servo gate signal assertion.

Figure 4:
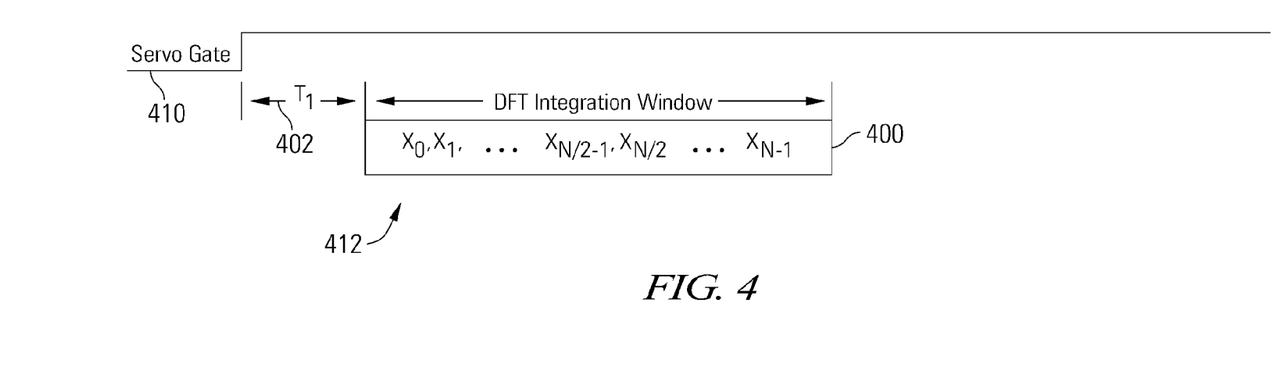
FIG. 4 depicts a DFT integration window in non-search mode operation in a servo zone detector in accordance with one or more embodiments of the present inventions.

Turning to FIG. 4, a DFT integration window 400 is depicted in non-search operation in a servo zone detector in accordance with one or more embodiments of the present inventions. In the non-search mode, the DFT integration window 400 starts a predetermined delay time 402 after the servo gate signal 410 is asserted. The DFT integration window 400 is defined in the search mode with a hard coded length of N samples or half the preamble length, although it is not limited to this length and may be hard coded or programmable. In the non-search operation, the location of the servo preamble is known or thought to be known, and the DFT integration window 400 is placed in only one location 412, including samples $X_0$ to $X_{N-1}$ after the delay 402. In the non-search mode, the winner is declared if the magnitude response is greater than the sum of some or all of the next largest magnitude responses. If a different candidate frequency is identified by the servo zone detector 216 in non-search mode than the current servo synthesizer frequency, the identified candidate frequency is stored so that the servo controller firmware can decide whether to change the synthesizer setting for the next servo event.

Figure 5:
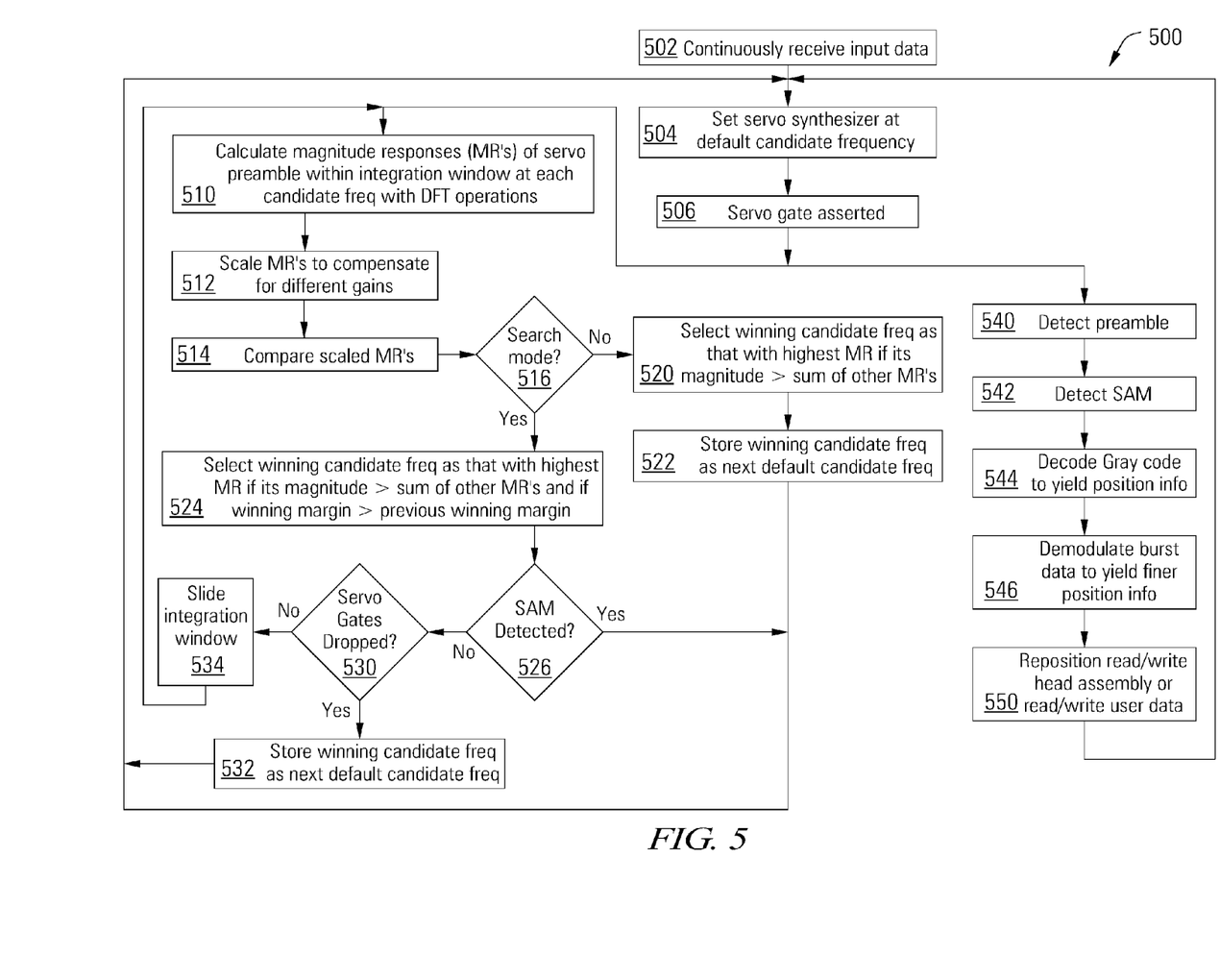
FIG. 5 depicts a flow diagram of an operation for detecting a servo zone frequency in accordance with one or more embodiments of the present inventions.

Turning to FIG. 5, a flow diagram 500 depicts an operation for detecting a servo zone frequency and identifying a servo location in accordance with one or more embodiments of the present inventions. Following flow diagram 500, input data is continuously received. (Block 502) The received data may be derived from, for example, a magnetic storage medium. The data may be derived from both the user data region and servo data regions, although the servo zone frequency detection and servo location identification is based on servo data fields such as the preamble and SAM. This process may be applied when positioning the read/write head assembly in both read and write data scenarios. The servo synthesizer is set at a default candidate frequency. (Block 504) The default candidate frequency is a frequency associated with a servo preamble in one of the servo zones. The default candidate frequency may be a hard-coded or programmed default value, or may be the preamble frequency from the last detected servo wedge zone or the preamble frequency for the servo wedge zone that the read/write head assembly is expected to move into. The servo gate signal is asserted to begin a servo event (block 506), during which the servo location will be identified and the servo zone frequency will be detected.

To detect the servo zone frequency, the magnitude responses (MR's) of the servo preamble being read are calculated at each servo zone candidate frequency, using DFT operations within an integration window. (Block 510) The magnitude responses are scaled to compensate for different gains on the preamble at candidate frequencies. (Block 512) For example, if the front end circuit processing the input data has a bandpass filter effect and thus produces a different gain at each candidate frequency, the magnitude responses may be scaled to compensate and make the gains more equal. The scaled magnitude responses are compared to assist in identifying the winning candidate frequency, or the candidate frequency of the servo wedge zone being read. (Block 514) A determination is made as to whether the servo zone detector is in search mode. (Block 516) If not in search mode, the winning candidate frequency is selected as that with the highest magnitude response if its magnitude is greater than the sum of the other magnitude responses. (Block 520) The winning candidate frequency is then stored as the next default candidate frequency. (Block 522) If the servo zone detector is in search mode, the winning candidate frequency is selected as that with the highest magnitude response if its magnitude is greater than the sum of the other magnitude responses and if the winning margin is greater than the previous winning margin. (Block 524) The winning margin is the ratio of the winning magnitude over the sum of the other magnitudes, and is reset for each servo gate. The servo zone detection process continues in search mode until the SAM is detected or until the servo gate drops. A determination is therefore made as to whether the SAM has been detected. (Block 526) If so, the current servo synthesizer frequency setting is correct, and the servo zone detection process can be ended until the next servo gate. If the SAM has not been detected, a determination is made as to whether the servo gate has dropped. (Block 530) If the servo gate dropped, the winning candidate frequency is stored as the next default candidate frequency. (Block 532) This allows the servo synthesizer frequency to be set to the detected frequency during the next servo event, or the search for the next servo wedge. In some embodiments, the servo synthesizer frequency may be set to the detected frequency immediately rather than waiting for the next servo event. If the servo gate has not dropped as determined in block 530, the sliding DFT integration window is moved to the next location in the data and the process of detecting the servo zone candidate frequency continues at block 510.

In parallel with the detection of the servo zone candidate frequency, the servo data is processed to detect the position of the read/write head assembly. This may include detecting the preamble (block 540), detecting the SAM (block 542), decoding the gray code to yield position information (block 544), and demodulating burst data to yield finer position information (block 546). The order of processing the servo data is not limited to that shown in FIG. 5, and may be performed in a different order. The processing of various servo data fields such as the preamble, Gray code, and burst data may be partially or completely performed in parallel. When the location of the read/write head assembly has been determined, the read/write head assembly may be moved to the desired location, or reading or writing of user data may proceed. (Block 550)

Figure 6:
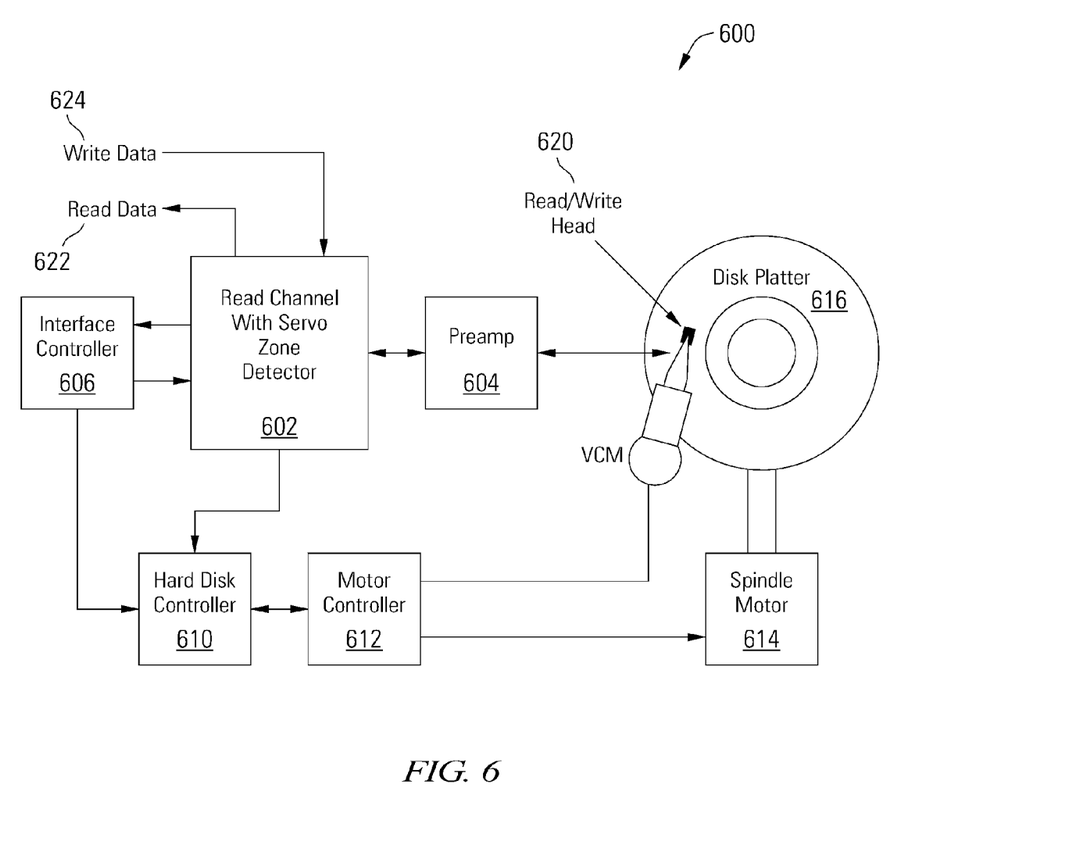
FIG. 6 depicts a storage system with a servo zone detector in accordance with one or more embodiments of the present inventions.

Turning to FIG. 6, a storage system 600 with servo zone detector is illustrated as an example application. The storage system 600 includes a read channel circuit 602 with servo zone detector. Storage system 600 may be, for example, a hard disk drive. Storage system 600 also includes a preamplifier 604, an interface controller 606, a hard disk controller 610, a motor controller 612, a spindle motor 614, a disk platter 616, and a read/write head assembly 620. In other embodiments, the servo zone detector may be located in interface controller 606, in hard disk controller 610, or elsewhere in the storage system 600. Similarly, the servo controller may be located in read channel 602, in interface controller 606, in hard disk controller 610, or elsewhere in the storage system 600. Interface controller 606 controls addressing and timing of data to/from disk platter 616. The data on disk platter 616 consists of groups of magnetic signals that may be detected by read/write head assembly 620 when the assembly is properly positioned over disk platter 616. In one embodiment, disk platter 616 includes magnetic signals recorded in accordance with either a longitudinal or a perpendicular recording scheme.

In a typical read operation, read/write head assembly 620 is accurately positioned by motor controller 612 over a desired data track on disk platter 616. Motor controller 612 both positions read/write head assembly 620 in relation to disk platter 616 and drives spindle motor 614 by moving read/write head assembly 620 to the proper data track on disk platter 616 under the direction of hard disk controller 610. Spindle motor 614 spins disk platter 616 at a determined spin rate (RPMs). Once read/write head assembly 620 is positioned adjacent the proper data track, magnetic signals representing data on disk platter 616 are sensed by read/write head assembly 620 as disk platter 616 is rotated by spindle motor 614. The sensed magnetic signals are provided as a continuous, minute analog signal representative of the magnetic data on disk platter 616. This minute analog signal is transferred from read/write head assembly 620 to read channel circuit 602 via preamplifier 604. Preamplifier 604 is operable to amplify the minute analog signals accessed from disk platter 616. In turn, read channel circuit 602 decodes and digitizes the received analog signal to recreate the information originally written to disk platter 616. This data is provided as read data 622 to a receiving circuit. A write operation is substantially the opposite of the preceding read operation with write data 624 being provided to read channel circuit 602. This data is then encoded and written to disk platter 616.

It should be noted that storage system 600 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 700, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

It should be noted that the various blocks discussed in the above application may be implemented in integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for servo zone detection. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for determining a sensor position comprising:
    a plurality of discrete Fourier transform calculators operable to process input data to yield a magnitude response of the input data at each of a plurality of candidate frequencies;
    a comparator operable to compare the magnitude responses to yield a winning candidate frequency;
    a servo controller operable to process at least one servo field in the input data to identify a position of a sensor based on the at least one servo field; and
    a servo frequency synthesizer operable to establish a frequency of operation in the servo controller based at least in part on the winning candidate frequency.

2. The apparatus of claim 1, wherein the input data comprises a servo preamble field and a servo address mark.

3. The apparatus of claim 2, wherein the input data is derived from a magnetic storage device with zoned servo wedges, and wherein the magnitude response is different for the servo preamble field in each of a plurality of servo wedge zones.

4. The apparatus of claim 1, further comprising a plurality of scalers operable scale each of the magnitude responses.

5. The apparatus of claim 1, wherein the comparator is operable to select as the winning candidate frequency that with a greatest magnitude response if the greatest magnitude response is larger than a sum of the magnitude responses for a remainder of the plurality of candidate frequencies.

6. The apparatus of claim 5, wherein the comparator is further operable calculate a winning margin comprising a ratio of the greatest magnitude response to the sum of the magnitude responses for the remainder of the plurality of candidate frequencies, and wherein the winning candidate frequency is selected only if the winning margin is greater than a previous winning margin.

7. The apparatus of claim 1, wherein the plurality of discrete Fourier transform calculators are operable to process the input data using a window of data samples from the input data.

8. The apparatus of claim 7, wherein a servo preamble field in the input data is at least twice as long as a length of the window.

9. The apparatus of claim 7, wherein the window is shifted across the input data and the magnitude responses are calculated at different window positions.

10. The apparatus of claim 9, wherein the window is shifted and the magnitude responses are calculated until a servo gate signal drops or until a servo address mark is detected.

11. The apparatus of claim 10, wherein the servo frequency synthesizer is operable to select the winning candidate frequency as the frequency of operation if the servo gate signal drops before the servo address mark is detected.

12. The apparatus of claim 1, wherein the servo controller is operable to identify the position of the sensor based at least in part on a servo address mark in the input data.

13. The apparatus of claim 1, wherein the plurality of discrete Fourier transform calculators, the comparator, the servo controller and the servo frequency synthesizer are implemented as an integrated circuit.

14. The apparatus of claim 1, wherein the plurality of discrete Fourier transform calculators, the comparator, the servo controller and the servo frequency synthesizer are incorporated in a storage device.

15. The apparatus of claim 14, wherein the storage device comprises a redundant array of independent disks.

16. A method for detecting a servo zone frequency, comprising:
    calculating a magnitude response using a discrete Fourier transform of data samples within a window at each of a plurality of candidate frequencies associated with servo wedge zones in a storage device;
    scaling the magnitude responses to yield scaled magnitude responses; and
    determining a winning candidate frequency as the servo zone frequency for a servo wedge zone being read, wherein the scaled magnitude response of the winning candidate frequency is greater than a sum of others of the scaled magnitude responses.

17. The method of claim 16, wherein determining the winning candidate frequency comprises calculating the winning margin comprising a ratio of a largest of the magnitude responses to the sum of others of the magnitude responses, and wherein the winning candidate frequency is selected only if the winning margin is greater than a previous winning margin.

18. The method of claim 16, wherein the window is shifted to a plurality of positions in a data stream and the calculating, scaling and determining is repeated.

19. The method of claim 16, wherein the window is positioned at a predetermined delay after a servo gate signal is asserted.

* * * * *